United States Patent
Hirata et al.

(10) Patent No.: US 11,736,255 B2
(45) Date of Patent: *Aug. 22, 2023

(54) WIRELESS COMMUNICATION DEVICE, WIRELESS COMMUNICATION TERMINAL, AND WIRELESS COMMUNICATION METHOD

(71) Applicant: Sony Group Corporation, Tokyo (JP)

(72) Inventors: Ryuichi Hirata, Kanagawa (JP); Yuichi Morioka, Kanagawa (JP); Kosuke Aio, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/882,615

(22) Filed: Aug. 8, 2022

(65) Prior Publication Data

US 2022/0386377 A1   Dec. 1, 2022

Related U.S. Application Data

(63) Continuation of application No. 16/959,678, filed as application No. PCT/JP2018/048421 on Dec. 28, 2018, now Pat. No. 11,431,452.

(30) Foreign Application Priority Data

Jan. 12, 2018  (JP) ................................. 2018-003164

(51) Int. Cl.
*H04W 74/08* (2009.01)
*H04L 5/00* (2006.01)
(Continued)

(52) U.S. Cl.
CPC .......... *H04L 5/0048* (2013.01); *H04L 5/0064* (2013.01); *H04W 72/23* (2023.01); *H04W 74/02* (2013.01); *H04W 74/0816* (2013.01)

(58) Field of Classification Search
CPC ....... H04L 5/0048; H04L 5/0064; H04L 5/14; H04L 5/001; H04L 5/1469; H04W 72/042;
(Continued)

(56) References Cited

U.S. PATENT DOCUMENTS

2010/0246531 A1* 9/2010 Chang ................. H04W 52/367
370/331
2019/0116018 A1* 4/2019 Aboul-Magd ............ H04L 5/14

FOREIGN PATENT DOCUMENTS

GB       2502627 A    12/2013
JP    2006-246142 A    9/2006
(Continued)

OTHER PUBLICATIONS

International Search Report and Written Opinion dated Feb. 12, 2019 for PCT/JP2018/048421 filed on Dec. 28, 2018, 8 pages.

*Primary Examiner* — Jamal Javaid
(74) *Attorney, Agent, or Firm* — Xsensus LLP

(57) ABSTRACT

A wireless communication system includes a wireless communication device that functions as a base station, and one or more wireless communication terminals that communicate with the wireless communication device as slave units, a controller in the wireless communication device sets propriety information indicating whether or not reception of a packet transmitted from the wireless communication terminals is possible during a downlink transmission period when the wireless communication device transmits a packet, and a communication section in the wireless communication device transmits the packet including the propriety information. Furthermore, a controller in the wireless communication terminal controls transmission of the packet to the wireless communication device, during the downlink transmission period when the wireless communication device transmits the packet, according to the propriety information (Continued)

included in the packet, the propriety information indicating whether or not reception of the packet transmitted from the wireless communication terminals is possible.

13 Claims, 11 Drawing Sheets

(51) Int. Cl.
*H04W 74/02* (2009.01)
*H04W 72/23* (2023.01)

(58) Field of Classification Search
CPC .. H04W 72/0446; H04W 74/02; H04W 84/12
See application file for complete search history.

(56) References Cited

FOREIGN PATENT DOCUMENTS

| | | |
|---|---|---|
| JP | 2017-28341 A | 2/2017 |
| WO | 2008/087465 A1 | 7/2008 |
| WO | 2011/099729 A2 | 8/2011 |
| WO | 2015/039094 A1 | 3/2015 |

* cited by examiner

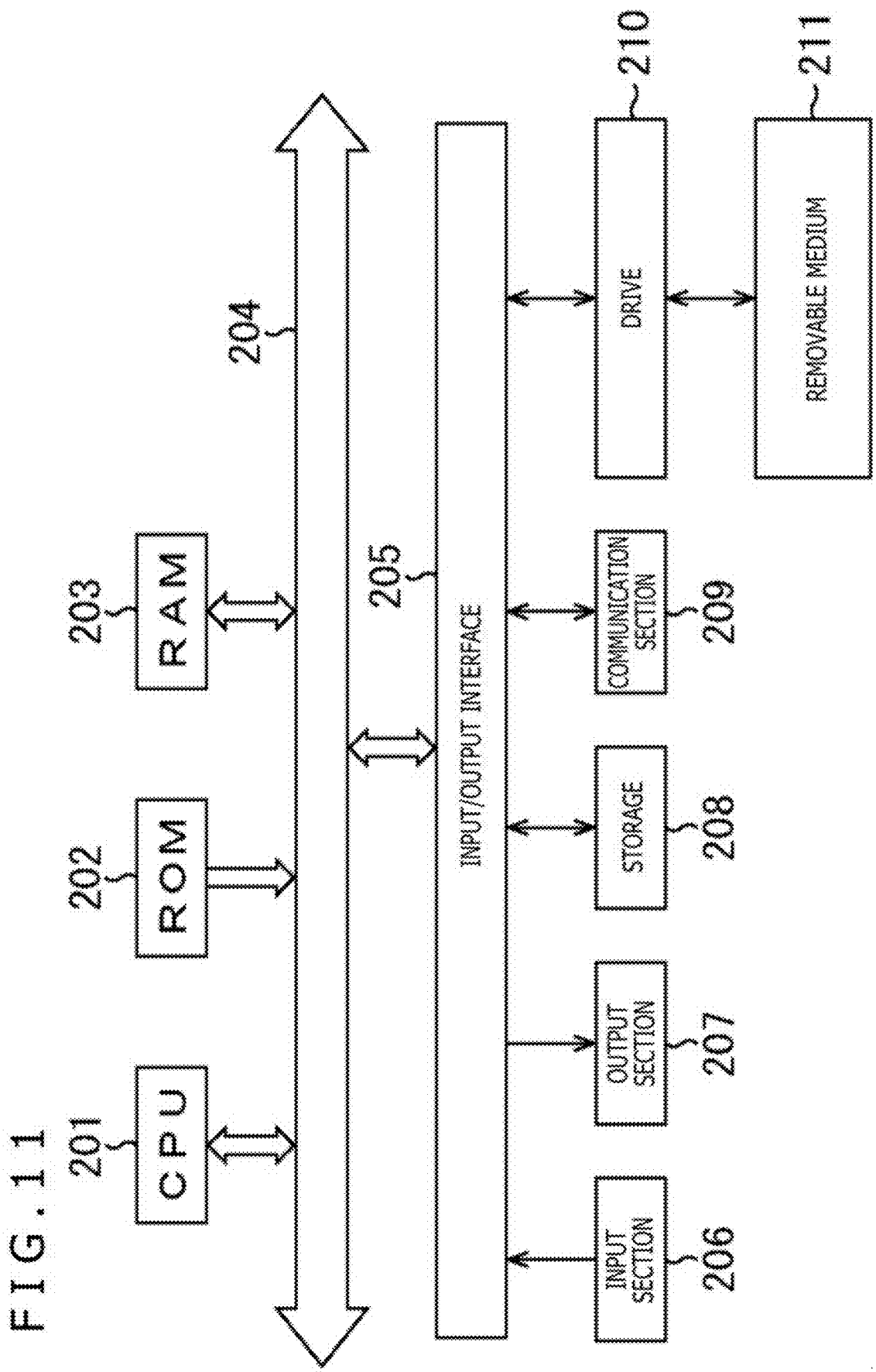

WIRELESS COMMUNICATION DEVICE, WIRELESS COMMUNICATION TERMINAL, AND WIRELESS COMMUNICATION METHOD

CROSS-REFERENCE TO RELATED APPLICATIONS

The present application is a continuation of U.S. application Ser. No. 16/959,678, filed Jul. 2, 2020, which is based on PCT filing PCT/JP2018/048421, filed Dec. 28, 2018, which claims priority to JP 2018-003164, filed Jan. 12, 2018, the entire contents of each are incorporated herein by reference.

TECHNICAL FIELD

The present technology relates to wireless communication devices, wireless communication terminals, and wireless communication methods, and particularly to a wireless communication device, a wireless communication terminal, and a wireless communication method that allow to avoid collision between packets in full duplex communication.

BACKGROUND ART

At present, as a technology for achieving higher efficiency of wireless communication, full duplex communication that can simultaneously perform transmission and reception has been examined. A wireless communication device and a wireless communication terminal corresponding to the full duplex communication can simultaneously transmit and receive packets. Therefore, significant improvement of frequency utilization efficiency can be expected.

For example, to efficiently utilize a simultaneous transmission and reception function of an extended wireless station, PTL 1 discloses a technology that allows the extended wireless station performing transmission or reception to communicate with another extended wireless station.

CITATION LIST

Patent Literature

[PTL 1]
Japanese Patent Laid-open No. 2017-028341

SUMMARY

Technical Problems

In a full duplex communication system configured with a wireless communication device and wireless communication terminals supporting full duplex communication, the wireless communication device and the wireless communication terminals can perform simultaneous transmission and reception. Therefore, for example, it is supposed that uplink communication from a first wireless communication terminal serving as a first slave unit to a wireless communication device serving as a base station (master unit) and downlink communication from the base station to a second wireless communication terminal serving as a second slave unit are simultaneously performed.

However, depending on disposition of the base station, the first slave unit, and the second slave unit, for example, the uplink communication from the first slave unit to the base station interferes with the downlink communication from the base station to the second slave unit. This may cause collision between a packet transmitted by the base station and a packet transmitted by the first slave unit, whereby the second slave unit may fail to receive the packet transmitted from the base station to the second slave unit in the downlink communication.

Moreover, in a case where the base station performs the downlink communication to the second slave unit, and receives the packet from the first slave unit, when a third wireless communication terminal serving as a third slave unit starts the uplink communication to the base station, collision between the packet transmitted by the first slave unit and a packet transmitted by the third slave unit may occur, whereby the base station may fail to receive the packet.

The present technology is conceived in view of such a situation, and enables to avoid collision between packets in full duplex communication.

Solution to Problems

A wireless communication device of the present technology is a wireless communication device in a wireless communication system including the wireless communication device that functions as a base station and one or more wireless communication terminals that communicate with the wireless communication device as slave units, the wireless communication device including a controller configured to set propriety information that indicates whether or not reception of a packet transmitted from the wireless communication terminals is possible during a downlink transmission period when the wireless communication device transmits a packet, and a communication section configured to transmit the packet including the propriety information.

A first wireless communication method of the present technology is a wireless communication method in a wireless communication system including a wireless communication device that functions as a base station and one or more wireless communication terminals that communicate with the wireless communication device as slave units, the wireless communication method including setting propriety information that indicates whether or not reception of a packet transmitted from the wireless communication terminals is possible during a downlink transmission period when the wireless communication device transmits a packet, and transmitting the packet including the propriety information.

In the wireless communication device and the first wireless communication method of the present technology, in a wireless communication system including a wireless communication device that functions as a base station and one or more wireless communication terminals that communicate with the wireless communication device as slave units, propriety information that indicates whether or not reception of a packet transmitted from the wireless communication terminals is possible during a downlink transmission period when the wireless communication device transmits a packet is set, and the packet including the propriety information is transmitted.

A wireless communication terminal of the present technology is a wireless communication terminal in a wireless communication system including a wireless communication device that functions as a base station and one or more wireless communication terminals that communicate with the wireless communication device as slave units, the wireless communication terminal including a controller that controls transmission of a packet to the wireless communication device, during a downlink transmission period when the wireless communication device transmits a packet, according to propriety information included in the packet, the propriety information indicating whether or not reception of packets transmitted from the wireless communication terminals is possible.

A second wireless communication method of the present technology is a wireless communication method in a wireless communication system including a wireless communication device that functions as a base station and one or more wireless communication terminals that communicate with the wireless communication device as slave units, the wireless communication method including controlling transmission of a packet to the wireless communication device, during a downlink transmission period when the wireless communication device transmits a packet, according to propriety information included in the packet, the propriety information indicating whether or not reception of packets transmitted from the wireless communication terminals is possible.

In the wireless communication terminal and the second wireless communication method of the present technology, in a wireless communication system including a wireless communication device that functions as a base station and one or more wireless communication terminals that communicate with the wireless communication device as slave units, transmission of a packet to the wireless communication device, during a downlink transmission period when the wireless communication device transmits a packet, is controlled according to propriety information included in the packet, the propriety information indicating whether or not reception of a packet transmitted from the wireless communication terminals is possible.

Advantageous Effects of Invention

According to the present technology, collision between packets can be avoided in full duplex communication.

Note that effects described herein are not necessarily limited, and may be any effect described in the present disclosure.

BRIEF DESCRIPTION OF DRAWINGS

FIG. 11 is a block diagram illustrating a configuration example of an embodiment of a computer to which the present technology is applied.

DESCRIPTION OF EMBODIMENTS

<Wireless Communication System>

Figure 1:
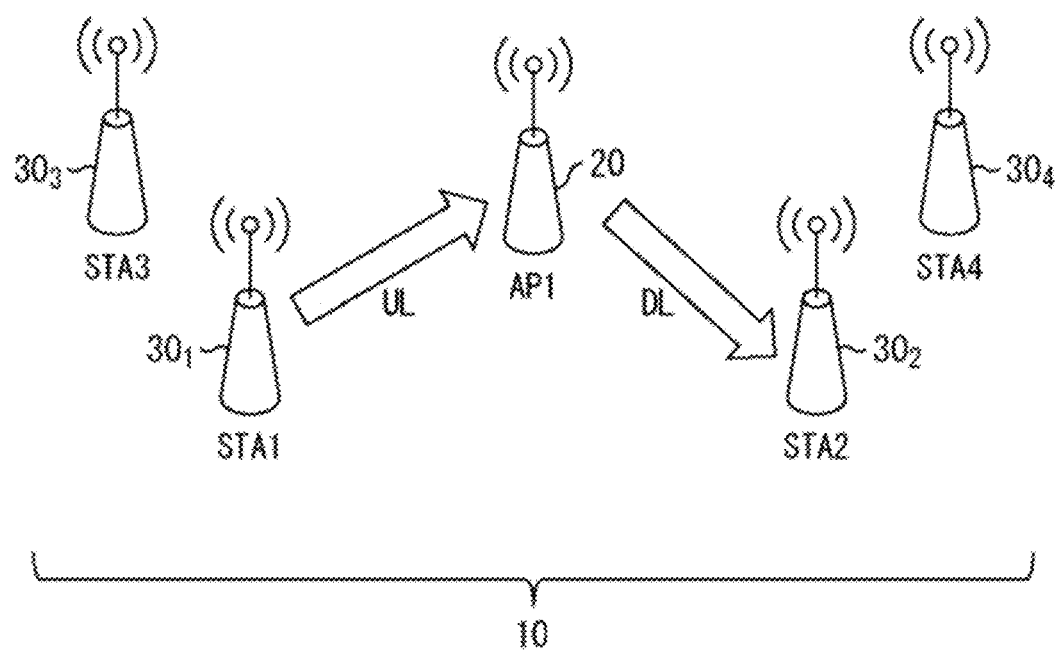
FIG. 1 is a view illustrating a configuration example of an embodiment of a wireless communication system to which the present technology is applied.

FIG. 1 is a view illustrating a configuration example of an embodiment of a wireless communication system to which the present technology is applied.

A wireless communication system 10 illustrated in FIG. 1 configures, for example, a wireless LAN (Local Area Network) standardized in IEEE (Institute of Electrical and Electronic Engineers) 802.11, and includes a communication device 20, a communication device $30_1$, a communication device $30_2$, a communication device $30_3$, and a communication device $30_4$.

The communication device 20 is a wireless communication device that functions as a base station (master unit) in the wireless LAN, and is a wireless communication device supporting full duplex communication that can simultaneously perform transmission and reception.

The communication devices $30_1$ to $30_4$ are wireless communication terminals that function as slave units in the wireless LAN, such as smartphones.

The communication device 20 and the communication device $30_i$ perform wireless communication conforming to the standards of IEEE 802.11, for example.

Herein, the communication device 20 is also described as AP (Access Point) 1. The communication device $30_1$, the communication device $30_2$, the communication device $30_3$, and the communication device $30_4$ are also described as STA (Station) 1, STA2, STA3, and STA4, respectively. Communication in which a packet is transmitted from AP1 to STA #i (here, i=1, 2, 3, and 4) is also described as downlink communication. In contrast, communication in which a packet is transmitted from STA #i to AP1 is also described as uplink communication.

In FIG. 1, the communication device $30_1$ (STA1) is performing the uplink communication (UL: UpLink) to the communication device 20 (AP1), and the communication device 20 (AP1) is performing the downlink communication (DL: DownLink) to the communication device $30_2$ (STA2).

Hereinafter, in a case where there is no need to discriminate the communication devices $30_1$ to $30_4$ from each other, the communication devices $30_1$ to $30_4$ are merely referred to as the communication devices 30, as appropriate.

Note that the configuration of the wireless communication system 10 illustrated in FIG. 1 is an example, and is not limited to this example. Further, for example, the number of the communication device 20 or the communication devices 30 is arbitrary, and is not limited to the embodiment in FIG. 1.

<Communication Device>

Figure 2:
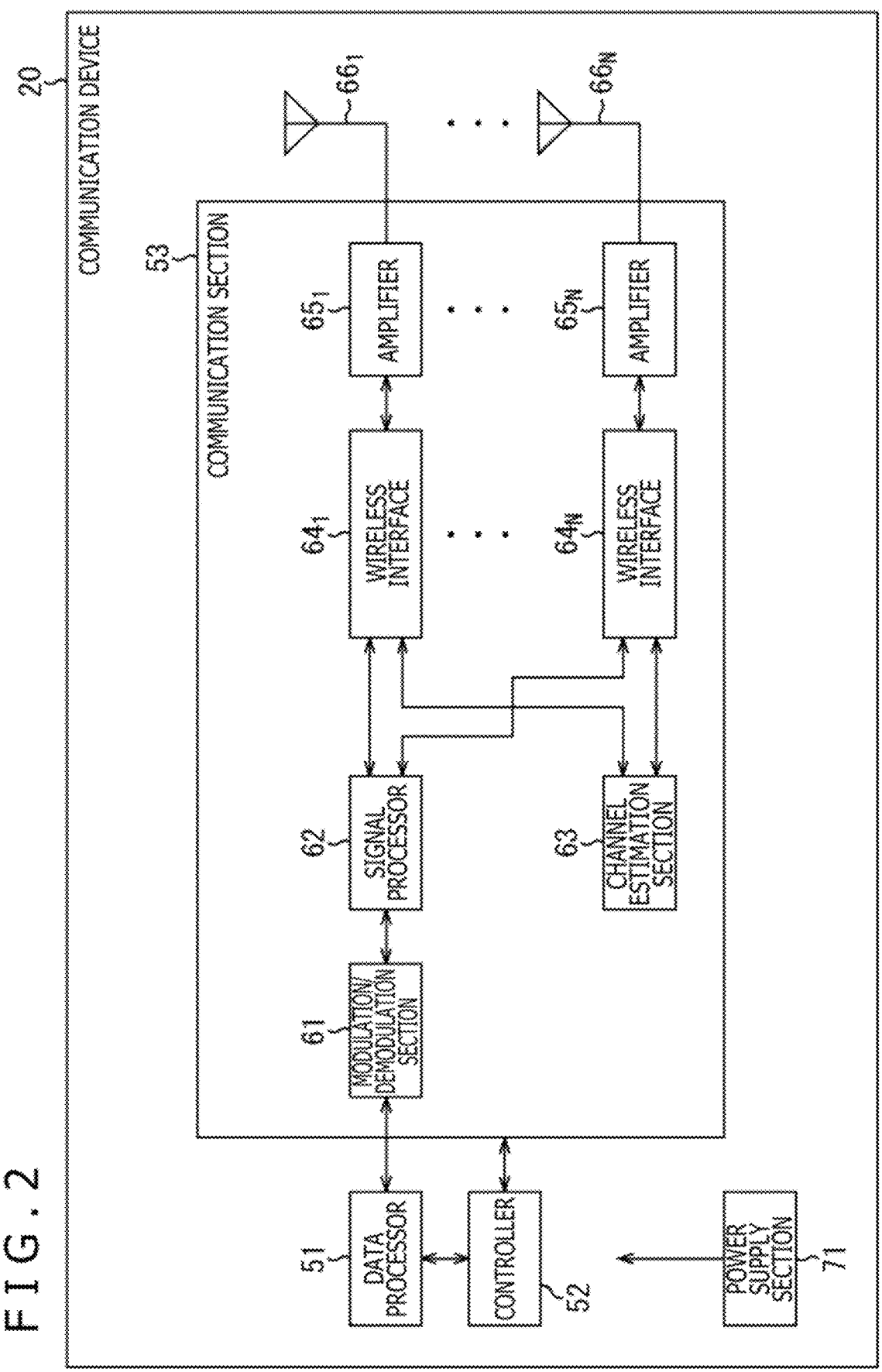
FIG. 2 is a block diagram illustrating a configuration example of a communication device 20.

FIG. 2 is a block diagram illustrating a configuration example of the communication device 20.

As illustrated in FIG. 2, the communication device 20 includes a data processor 51, a controller 52, a communication section 53, antennas $66_1$ to $66_N$, and a power supply section 71. The communication section 53 includes a modulation/demodulation section 61, a signal processor 62, a channel estimation section 63, wireless interfaces $64_1$ to $64_N$, and amplifiers $65_1$ to $65_N$.

In a case where the data processor 51 transmits data input from a protocol upper layer, that is, a packet (frame) is transmitted, the data processor 51 generates the packet for performing wireless transmission from the data input from the protocol upper layer. Further, the data processor 51 performs data processing such as addition of a header and an error detecting code for performing media access control (MAC (Media Access Control)). The data processor 51 supplies the packet obtained by the data processing to the modulation/demodulation section 61.

In a case where the data processor 51 receives data from the modulation/demodulation section 61, that is, the packet is received, the data processor 51 performs data processing such as analysis of a MAC header, detection of a packet error, and reordering processing on the packet supplied from the modulation/demodulation section 61. The data processor 51 supplies data obtained by the data processing to the protocol upper layer.

The controller 52 transfers information between respective sections (the data processor 51, the controller 52, and the communication section 53 (the modulation/demodulation section 61, the signal processor 62, the channel estimation section 63, the wireless interfaces $64_1$ to $64_N$, and the amplifiers $65_1$ to $65_N$)). Further, the controller 52 performs control of respective sections such as parameter setting in the modulation/demodulation section 61 and the signal processor 62, scheduling of the packet in the data processor 51, parameter setting in the wireless interfaces $64_1$ to $64_N$ and the amplifiers $65_1$ to $65_N$, and control of transmission power.

In a case where the downlink communication is performed, the controller 52 determines whether or not reception of a packet of the communication devices 30 in the uplink communication is possible, according to states of the communication devices 30 in the uplink communication, and sets propriety information indicating whether or not reception of the packet transmitted from the communication devices 30 is possible during a downlink transmission period in which the communication device 20 transmits the packet, according to the determination result. In addition, the controller 52 controls respective sections to include the propriety information in the packet in the downlink communication.

The communication section 53 performs processing necessary for transmitting and receiving the packet with wireless communication, and performs transmission and reception of the packet through the antenna $66_i$.

The antenna $66_i$ transmits the packet supplied from the communication section 53 as a wireless signal. Further, the antenna $66_i$ receives the wireless signal of the packet, and supplies the wireless signal to the communication section 53.

In a case where the packet is transmitted, the modulation/demodulation section 61 performs transformation processing such as encoding, interleaving, and modulation, on the packet supplied from the data processor 51, on the basis of a coding method and a modulation method whose parameters are set by the controller 52, and generates a data symbol stream. The modulation/demodulation section 61 supplies the generated data symbol stream to the signal processor 62.

On the other hand, in a case where the packet is received, the modulation/demodulation section 61 performs processing opposite (inverse) to the processing in the case where the packet is transmitted, which is described above, on the data symbol stream supplied from the signal processor 62. In other words, the modulation/demodulation section 61 performs inverse processing such as demodulation, deinterleaving, and decoding, on the data symbol stream supplied from the signal processor 62, and supplies the packet obtained by the inverse processing to the data processor 51 and the controller 52.

In a case where the packet is transmitted, the signal processor 62 performs, as necessary, signal processing including spatial processing such as MIMO (Multiple-Input and Multiple-Output), on the data symbol stream supplied from the modulation/demodulation section 61, and generates one or more transmission symbol streams. The signal processor 62 supplies each generated transmission symbol stream to the wireless interface $64_i$.

On the other hand, in a case where the packet is received, the signal processor 62 performs signal processing on the reception symbol stream supplied from the wireless interface $64_i$, performs spatial processing on the reception symbol stream as necessary, and supplies the resultant data symbol stream to the modulation/demodulation section 61.

The channel estimation section 63 calculates a complex channel gain of a propagation path based on a preamble part and a training signal part in the reception symbol stream supplied from the wireless interface $64_i$. The channel estimation section 63 supplies the calculated complex channel gain to the modulation/demodulation section 61 and the signal processor 62 through the controller 52. The modulation/demodulation section 61 uses the complex channel gain supplied from the channel estimation section 63 for the demodulation processing. The signal processor 62 uses the complex channel gain supplied from the channel estimation section 63 for the spatial processing.

In a case where the packet is transmitted, the wireless interface $64_i$ DA (Digital to Analog)-converts the transmission symbol stream input from the signal processor 62 to an analog signal, and performs processing such as filtering and up-conversion to a carrier frequency. The wireless interface $64_i$ supplies a transmission signal obtained through the processing such as the DA conversion, the filtering, and the up-conversion to the carrier frequency to the amplifier $65_i$.

On the other hand, in a case where the packet is received, the wireless interface $64_i$ performs processing opposite to the processing in the case where the packet is transmitted, on an input (reception signal) from the amplifier $65_i$, and supplies the signal (reception symbol stream) obtained by the opposite processing to the signal processor 62 and the channel estimation section 63.

In a case where the packet is transmitted, the amplifier $65_i$ amplifies the transmission signal from the wireless interface $64_i$ up to predetermined power, and the communication device 20 transmits the amplified transmission signal from the antenna $66_i$ as the wireless signal (radiates the signal in the air).

In a case where the packet is received, the amplifier $65_i$ amplifies the wireless signal received by the antenna $66_i$ up to predetermined power, and supplies the wireless signal to the wireless interface $64_i$ as the reception signal.

Note that, with respect to the amplifier $65_i$, at least one of a function upon transmitting or a function upon receiving can be included in the wireless interface $64_i$. In a case where both of the function upon transmitting and the function upon receiving are included in the wireless interface $64_i$, the communication section 53 is configured without the amplifier $65_i$.

The power supply section 71 is configured with a battery power supply or a fixed power supply, and supplies power to respective sections in the communication device 20.

The number of each of the wireless interface $64_i$, the amplifier $65_i$, and the antenna $66_i$ may be arbitrary, and may be one, or may be three or more.

Alternatively, the wireless interface $64_i$, the amplifier $65_i$, and the antenna $66_i$ may be configured as one component (these sections may be configured as one processor).

Figure 3:
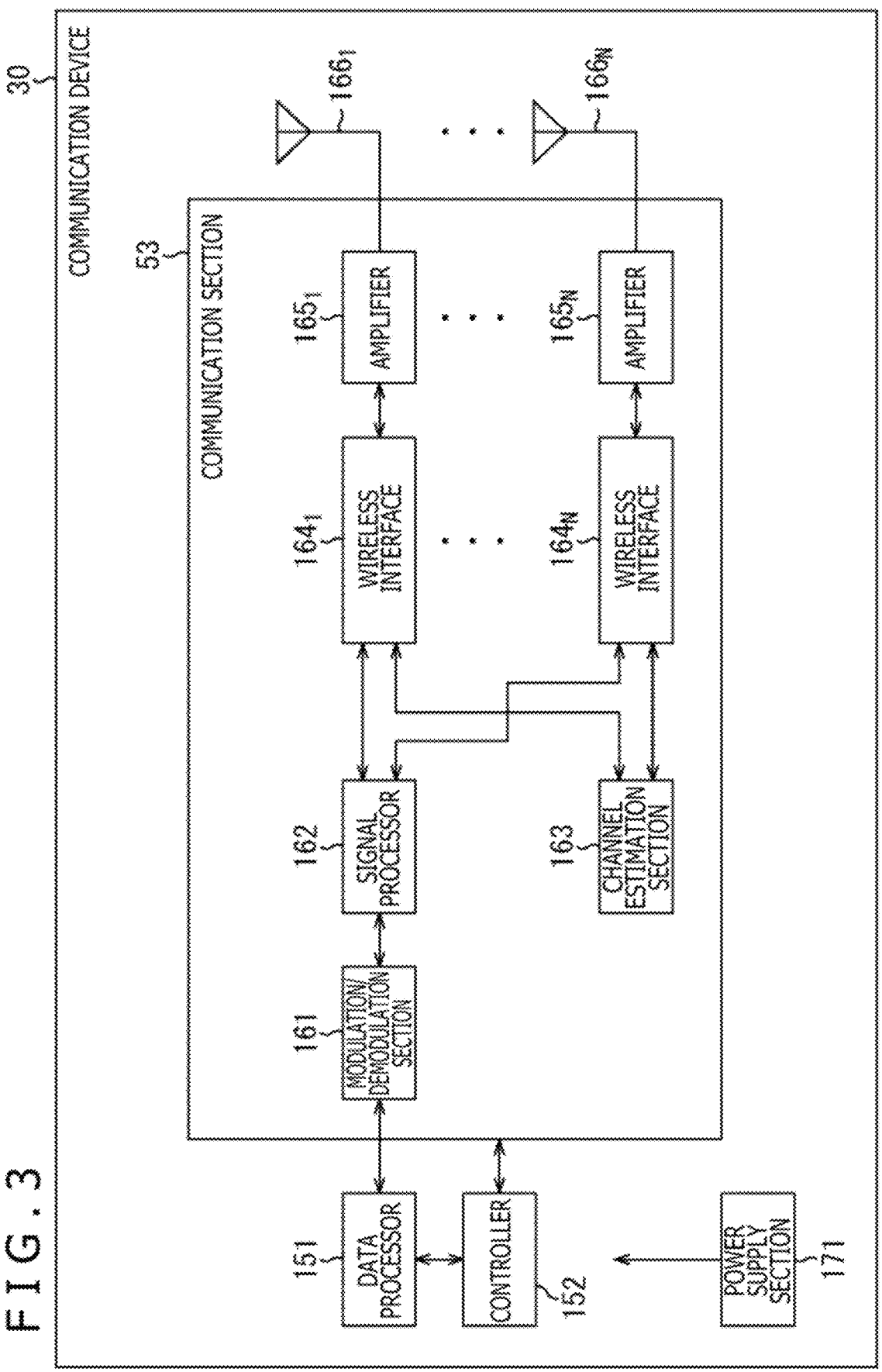
FIG. 3 is a block diagram illustrating a configuration example of a communication device 30.

FIG. 3 is a block diagram illustrating a configuration example of each communication device 30.

As illustrated in FIG. 3, each communication device 30 includes a data processor 151, a controller 152, a communication section 153, antennas $166_1$ to $166_N$, and a power supply section 171. The communication section 153 includes a modulation/demodulation section 161, a signal processor 162, a channel estimation section 163, wireless interfaces $164_1$ to $164_N$, and amplifiers $165_1$ to $165_N$.

Herein, the data processor 151, the communication section 153 (the modulation/demodulation section 161, the signal processor 162, the channel estimation section 163, the wireless interfaces $164_1$ to $164_N$, and the amplifiers $165_1$ to $165_N$), the antennas $166_1$ to $166_N$, and the power supply section 171 are configured similarly to the data processor 51, the communication section 53 (the modulation/demodulation section 61, the signal processor 62, the channel estimation section 63, the wireless interfaces $64_1$ to $64_N$, and the amplifiers $65_1$ to $65_N$), the antennas $66_1$ to $66_N$, and the power supply section 71 which are illustrated in FIG. 2, respectively, thereby omitting description.

Similarly to the controller 52 in FIG. 2, the controller 152 transfers information between respective sections (the data processor 151 and the communication section 153 (the modulation/demodulation section 161, the signal processor 162, the channel estimation section 163, the wireless interfaces $164_1$ to $164_N$, and the amplifiers $165_1$ to $165_N$)). Further, similarly to the controller 52 in FIG. 2, the controller 152 performs control of respective sections such as parameter setting in the modulation/demodulation section 161 and the signal processor 162, scheduling of the packet in the data processor 151, parameter setting in the wireless interfaces $164_1$ to $164_N$ and the amplifiers $165_1$ to $165_N$, and control of transmission power.

Furthermore, the controller 152 determines whether or not transmission of the packet to the communication device 20 is possible on the basis of the propriety information included in the packet in the downlink communication, that is, the packet from the communication device 20, and controls transmission of the packet to the communication device 20 according to the result of determined propriety. In other words, in a case where the propriety information indicates reception possibility indicating that reception of the packet is possible, the controller 152 starts preparing to transmit the packet, and transmits the packet. In a case where the propriety information indicates reception impossibility indicating that reception of the packet is impossible, the controller 152 controls respective sections to refrain from transmitting the packet.

<DL Packet>

Figure 4:
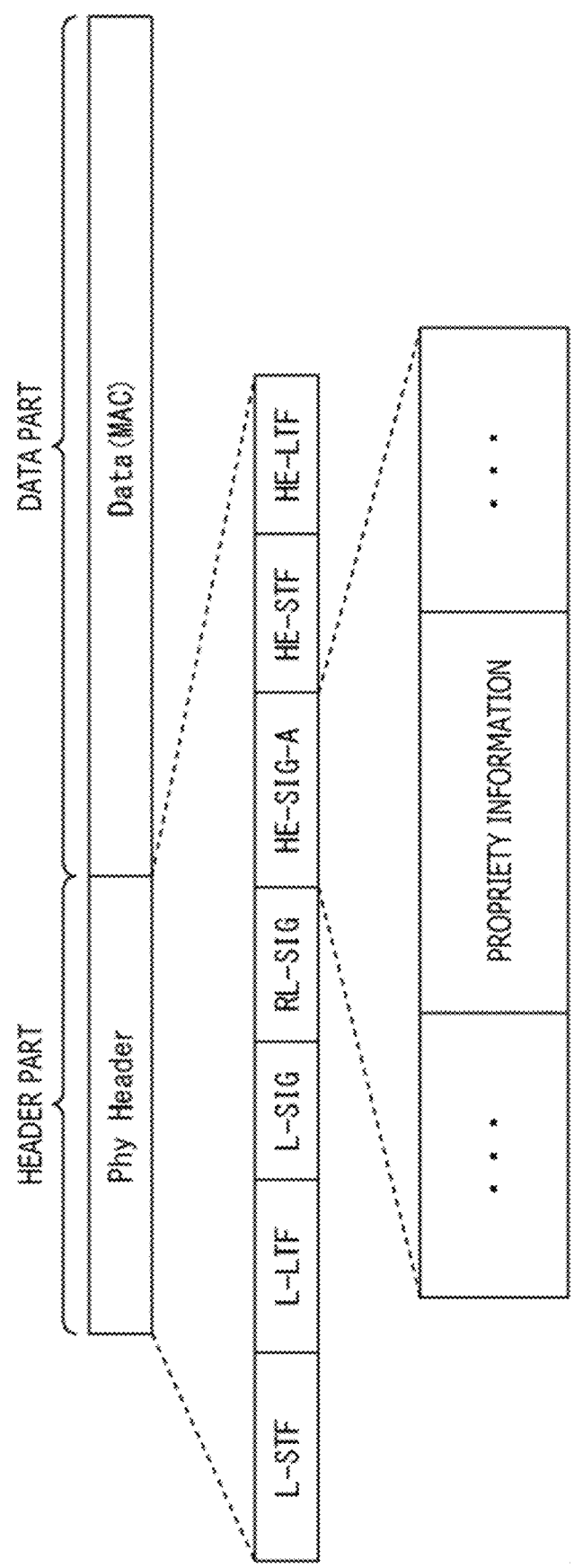
FIG. 4 is a view illustrating a first embodiment of a format of a packet to be transmitted in downlink communication from AP1 (communication device 20) to STA #i (communication device $30_i$).

FIG. 4 is a view illustrating a first embodiment of a format of the packet to be transmitted from AP1 (communication device 20) to STA #i (communication device $30_i$) in downlink communication.

Herein, the packet transmitted from AP1 to STA #i in the downlink communication is also referred to as a DL packet. The DL packet of the first embodiment includes one piece of the propriety information in a header part.

The DL packet illustrated in FIG. 4 is a packet standardized in IEEE 802.11ax, for example, and is configured while disposing a PHY (Physical) header (Phy Header) as the header part of the DL packet and Data (MAC) as a data part of the DL packet, in this order. In the header part, L-STF, L-LTF, L-SIG, RL-SIG, HE-SIG-A, HE-STF, and HE-LTF are disposed in this order.

In AP1, for example, the propriety information indicating propriety of reception of the packet by AP1 can be included in the header part in the DL packet. With respect to the propriety information, a new field is extended in HE-SIG-A in the header part, and the propriety information can be included in the new field thus extended. Alternatively, the propriety information can be included in a portion defined as Reserved in HE-SIG-A in the header part.

Note that the propriety information can be included in an arbitrary position other than HE-SIG-A in the header part. Alternatively, a field as a new header part is extended between the header part and the data part, and the propriety information can be included in the new field.

Otherwise, the propriety information can be included in a field for including other existing information of the DL packet. Furthermore, the propriety information can be included in an arbitrary position such as the middle, the head, or the tail of HE-SIG-A.

Figure 5:
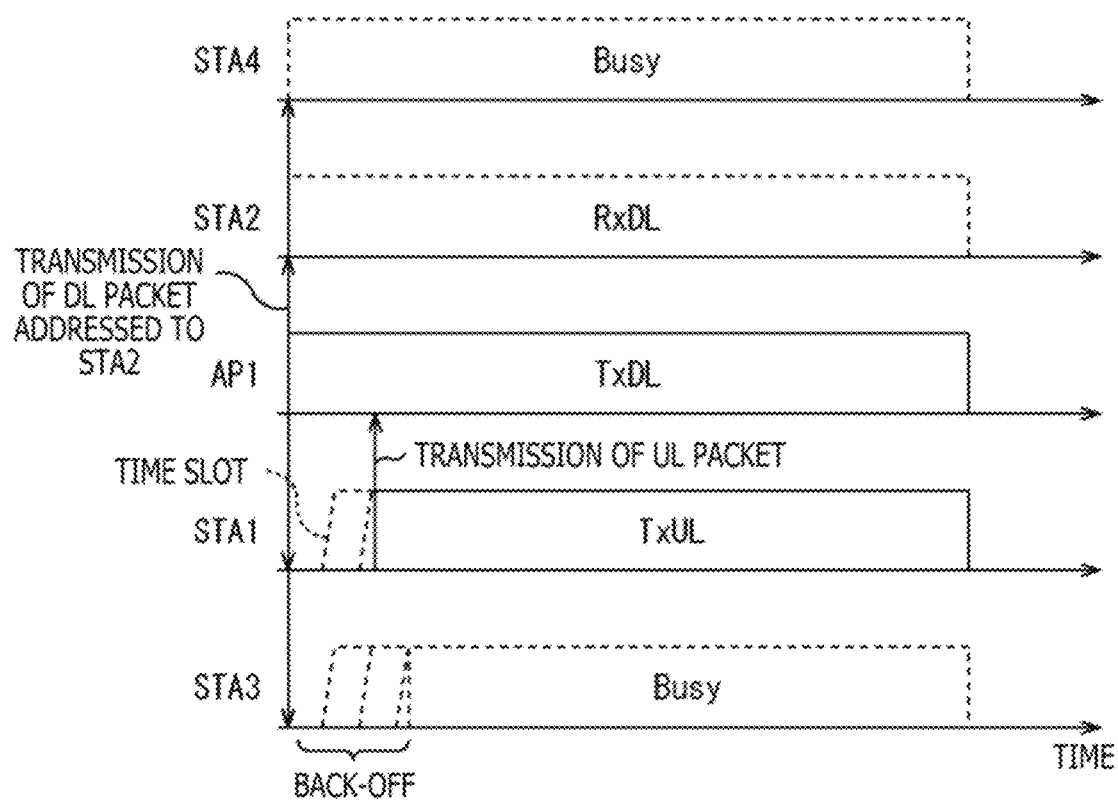
FIG. 5 is a sequence diagram explaining an operation example performed in AP1, and STA1 to STA4.

FIG. 5 is a sequence diagram explaining an operation example performed in AP1, and STA1 to STA4.

AP1 and STA #i include information regarding possibility for performing an operation according to the propriety information upon, for example, starting connection in, for example, "capability field" in each packet to be exchanged upon, for example, starting connection, and transmit and receive each packet. With this configuration, AP1 and STA #i mutually determine (grasp) whether or not the operation according to the propriety information can be performed. Further, STA #i performs transmission and reception (exchange) of the packet with another STA #i, and stores reception power of a signal transmitted from the other STA #i.

In FIG. 5, a horizontal axis represents time. Further, in FIG. 5, solid lines represent a transmission operation of the packet, and broken lines represent other operations.

In FIG. 5, AP1 performs the downlink communication that transmits the DL packet addressed to STA2 (TxDL).

The DL packet to be transmitted from AP1 to STA2 in the downlink communication includes the propriety information and information regarding STA2 that is an address. The packet addressed to STA2 is received by STA2 (RxDL), and is also received by STA1, STA3, and STA4 besides STA2.

Herein, in the uplink communication from STA #i to AP1, the packet transmitted by STA #i is also referred to as a UL packet.

Now, for example, it is assumed that an amount of interference on STA2 in a case where STA1 and STA 3 each transmit the UL packet in the uplink communication is less than a first threshold, and the amount of interference on STA2 in a case where STA4 transmits the UL packet to AP1 in the uplink communication is more than the first threshold. Herein, the first threshold is, for example, a fixed value held by STA #i or a threshold informed from AP1.

In STA #i, the amount of interference due to transmission of the UL packet is estimated from reception power stored upon starting connection.

Each of STA1, STA3, and STA4 receives, from AP1, the DL packet addressed to STA2, and detects that an address of the DL packet from AP1 is STA2 from an address included in the DL packet.

For STA4, the amount of interference on STA2 that is the address of AP1 in the downlink communication is more than the first threshold in a case where STA4 transmits the UL packet to AP1, and therefore STA4 refrains from transmitting the UL packet to AP1 (Busy).

On the other hand, for STA1 and STA3, the amount of interference on STA2 that is the address of AP1 in the downlink communication is less than the first threshold in a case where each of STA1 and STA3 transmits the UL packet to AP1, and therefore STA1 and STA3 start preparing to transmit the UL packet to AP1, that is, for example, acquiring a transmission right, in a case where the propriety information included in the DL packet addressed to STA2 indicates reception possibility (reception of the UL packet is possible). In the present embodiment, to acquire the transmission right, for example, time slots (time) having a random number are set, and back-off that refrains from transmitting the UL packet during a period corresponding to the time slots is performed.

In FIG. 5, a waiting time for STA1 is illustrated during a period corresponding to one slot, and a waiting time for STA3 is illustrated during a period corresponding to two slots. Accordingly, STA1 terminates the back-off prior to STA3, and acquires the transmission right prior to STA3. After acquiring the transmission right, STA1 starts transmitting the UL packet to AP1 (TxUL).

At a time point when STA3 terminates the back-off, STA3 tries to start transmitting the UL packet to AP1, but detects that STA1 is transmitting the UL packet to AP1, that is, detects that a signal with (reception) power exceeding (more than) a second threshold is being transmitted. According to the detection, STA3 refrains from transmitting the UL packet (Busy) to avoid collision with the UL packet of STA1. This can avoid collision between the UL packet transmitted by STA1 and the UL packet transmitted by STA3. Herein, the second threshold is, for example, a threshold different from the first threshold, and is a fixed value held by STA #i or a threshold informed from AP1, for example.

Figure 6:
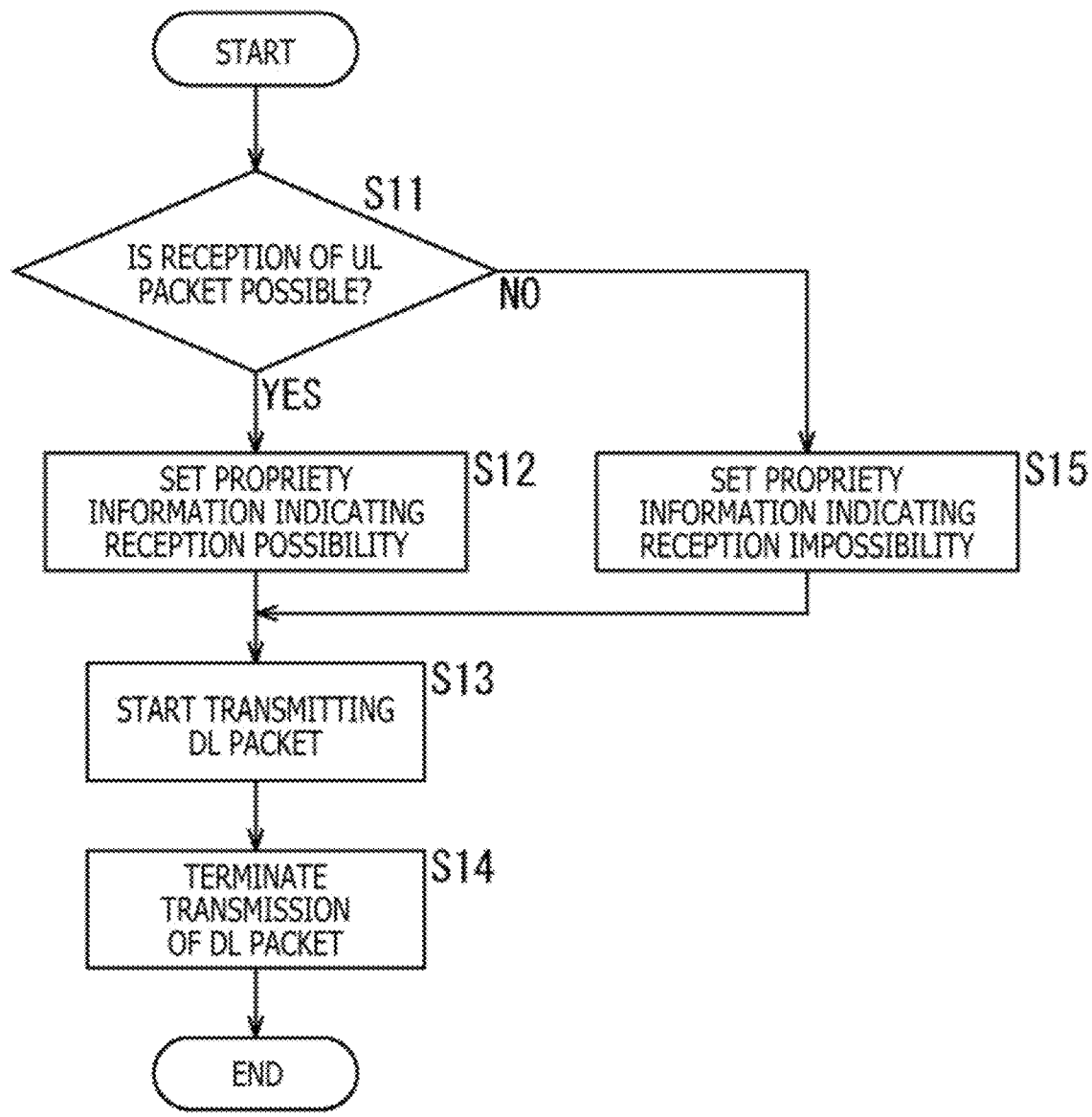
FIG. 6 is a flowchart explaining an example of a process performed in AP1.

FIG. 6 is a flowchart explaining an example of a process performed in AP1.

In step S11, AP1 determines whether or not reception of the UL packet in the uplink communication is possible on the basis of whether or not the UL packet from STA #i in the uplink communication is being received (a state of the uplink communication).

In step S11, in a case where AP1 determines that reception of the UL packet in the uplink communication is possible, that is, in a case where the UL packet is not being received from any STA #i, the process proceeds to step S12.

In step S12, AP1 sets the propriety information so as to indicate reception possibility, and the process proceeds to step S13.

On the other hand, in step S11, in a case where AP1 determines that reception of the UL packet in the uplink communication is impossible, that is, in a case where the UL packet is being received from any STA #i, the process proceeds to step S15.

In step S15, AP1 sets the propriety information so as to indicate reception impossibility, and the process proceeds to step S13.

In step S13, AP1 starts transmitting the DL packet that includes the propriety information in the header part, and the process proceeds to step S14.

In step S14, AP1 transmits the DL packet up to the last of the data part, and then terminates transmission of DL packet to terminate the process.

Figure 7:
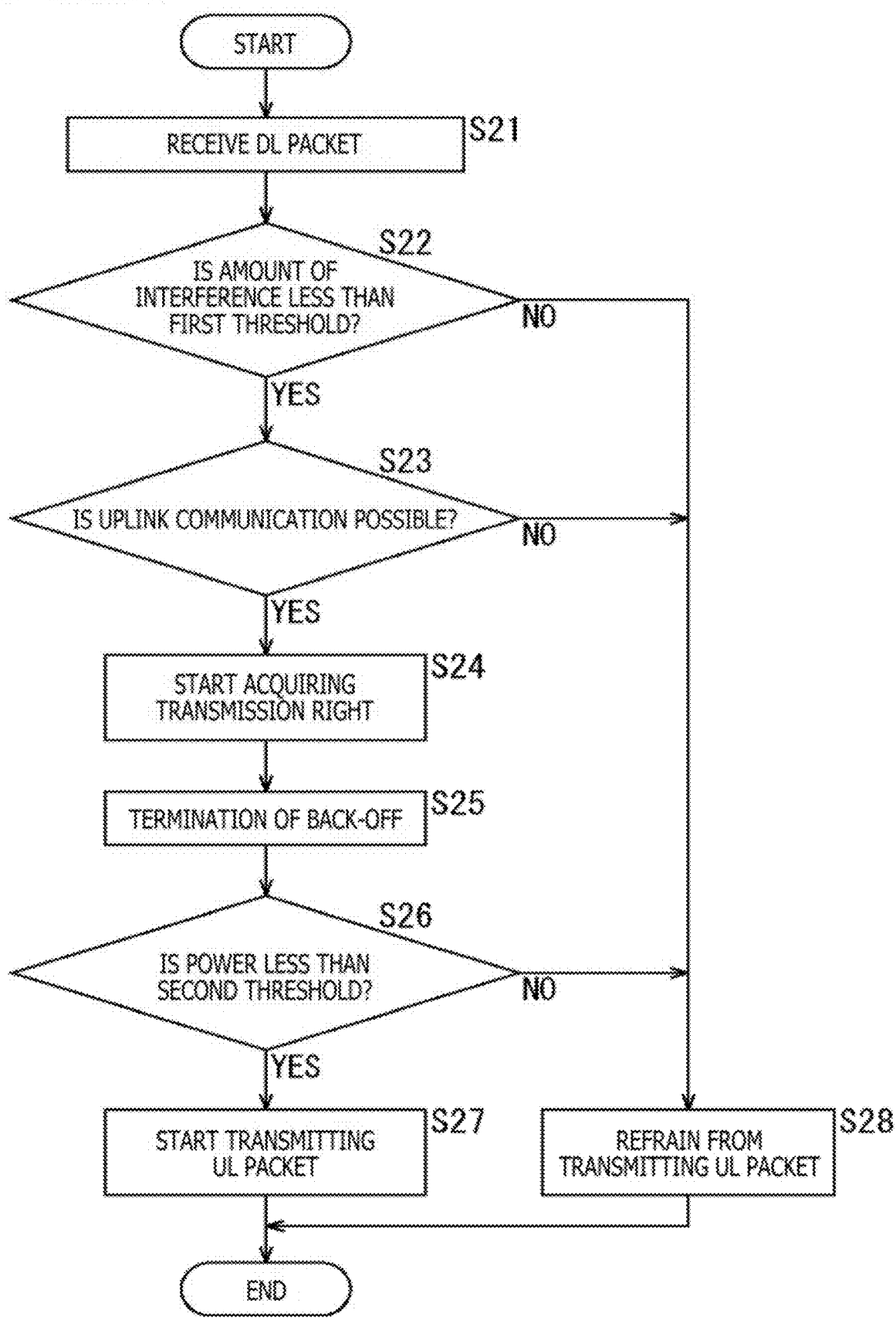
FIG. 7 is a flowchart explaining an example of a process performed in STA #i.

FIG. 7 is a flowchart explaining an example of a process performed in STA #i.

In step S21, STA #i waits transmission of the DL packet from AP1, and then starts receiving the DL packet. The process then proceeds to step S22 from step S21.

In step S22, STA #i detects the address of the DL packet from AP1, and STA #i determines whether or not the amount of interference on the address of the DL packet in a case where STA #i transmits the UL packet to AP1 in the uplink communication is less than the first threshold such as the fixed value held by STA #i or the threshold informed from AP1.

In step S22, in a case where STA #i determines that the amount of interference on the address of the DL packet in a case where STA #i transmits the UL packet to AP1 in the uplink communication is more than the first threshold, the process proceeds to step S28.

In step S28, STA #i refrains from transmitting the UL packet to AP1, and the process is terminated.

On the other hand, in step S22, in a case where STA #i determines that the amount of interference on the address of the DL packet in a case where STA #i transmits the UL packet to AP1 in the uplink communication is less than the first threshold, the process proceeds to step S23.

In step S23, STA #i determines whether or not the uplink communication, that is, transmission of the UL packet to AP1 is possible from the propriety information included in the header part of the DL packet from AP1.

In step S23, in a case where STA #i determines that the uplink communication is impossible, that is, in a case where the propriety information included in the header part of the DL packet from AP1 indicates reception impossibility, the process proceeds to step S28, and STA #i refrains from transmitting the UL packet to AP1 as described above.

On the other hand, in step S23, in a case where STA #i determines that the uplink communication is possible, that is, in a case where the propriety information included in the header part of the DL packet from AP1 indicates reception possibility, the process proceeds to step S24.

In step S24, as preparation of transmission of the UL packet to AP1, STA #i starts acquiring the transmission right, and sets a random waiting time (the time slots in a random number). The process then proceeds to step S25.

As described above, in a case where interference does not occur between STA #i and the address to which AP1 is transmitting the DL packet (the amount of interference is less than the first threshold), and the propriety information in the DL packet received from AP1 indicates reception possibility, STA #i starts preparing to transmit the UL packet to AP1.

In step S25, STA #i waits termination of the back-off (termination of the time slots), and the process proceeds to step S26.

In step S26, STA #i determines whether or not transmission of a signal with (reception) power that exceeds the second threshold that is different from the first threshold, and is the fixed value held by STA #i or the threshold informed from AP1 is performed.

In step S26, in a case where STA #i determines that transmission of the signal with power exceeding the second threshold is being performed, the process proceeds to step S28, and STA #i refrains from transmitting the UL packet to AP1 as described above.

On the other hand, in step S26, in a case where STA #i determines that transmission of the signal with power exceeding the second threshold is not being performed, the process proceeds to step S27.

In step S27, STA #i starts transmitting the UL packet to AP1, and after terminating transmission of the UL packet up to the last of the data part, the process terminates.

As described above, while AP1 transmits the DL packet including the propriety information, STA #i determines whether or not the uplink communication, that is, the transmission of the UL packet to AP1 is possible, and controls the transmission of the UL packet. Accordingly, in the wireless communication system 10, occurrence of interference between STAs in the full duplex communication can be reduced.

Specifically, for example, simultaneous occurrence of a plurality of pieces of uplink communication to AP1 can be prevented. Further, AP1 can be prevented from failing reception of the UL packet in the uplink communication, that is, collision between packets occurring due to transmission of packets from a plurality of STAs can be avoided. In addition, AP1 can perform the full duplex communication without collecting information such as a traffic amount of STA #i.

Figure 8:
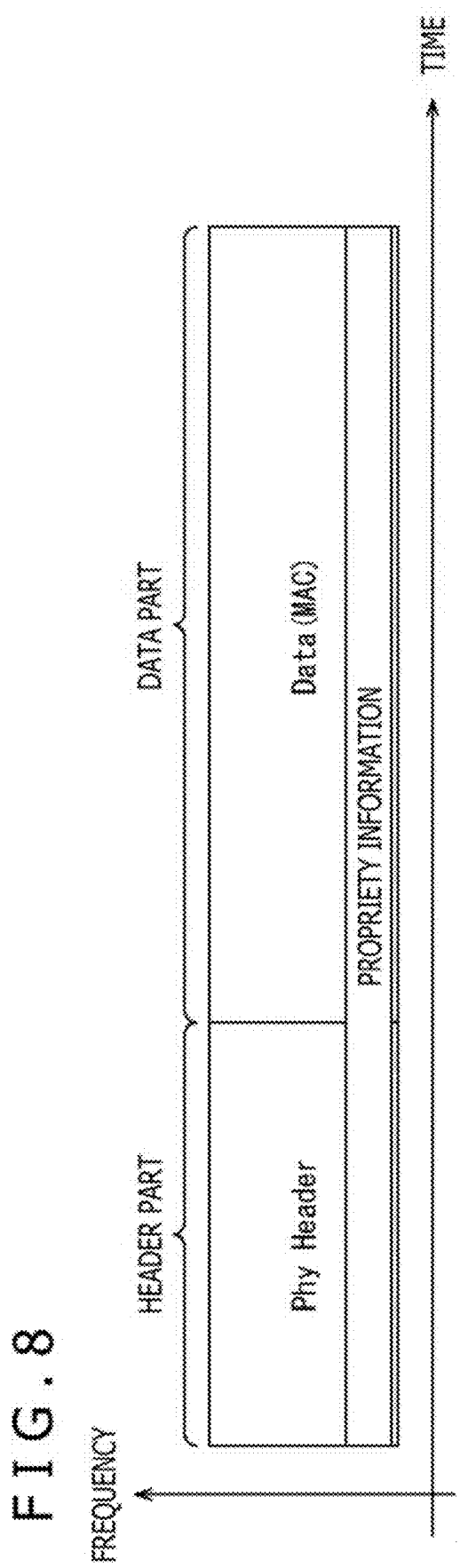
FIG. 8 is a view illustrating a second embodiment of a format of a DL packet to be transmitted from AP1 (communication device 20) to STA #i (communication device $30_i$) in the downlink communication.

FIG. 8 is a view illustrating a second embodiment of the format of the DL packet to be transmitted from AP1 (communication device 20) to STA #i (communication device $30_i$) in the downlink communication.

The DL packet of the second embodiment includes a plurality of pieces of propriety information.

In FIG. 8, a horizontal axis represents time, and a vertical axis represents a frequency.

Furthermore, similarly to FIG. 3, the DL packet illustrated in FIG. 8 is, for example, a packet standardized in IEEE 802.11ax, and is configured by disposing the PHY header (Phy Header) as the header part in the DL packet, and Data (MAC) as the data part in the DL packet in this order.

The propriety information can be included in the header part in the packet, or can be included in the packet in various forms. Further, the propriety information can be included at one position (one position on the time or the frequency) in the packet, or can be included at a plurality of positions.

Note that, it is assumed that insertion positions that are the plurality of positions each including the propriety information are predetermined.

For example, one or more pieces of the propriety information can be included in the header part or the data part in the packet. Further, one or more pieces of the propriety information can be included in each of the header part and the data part in the packet.

For the propriety information, a signal in a part of a communication band when the DL packet is transmitted or a part of a subcarrier when the DL packet is transmitted may be used. In a case where the signal in the part of the communication band or the part of the subcarrier is used for the propriety information, presence and absence of the signal or the subcarrier indicate reception impossibility and reception possibility, for example.

In a case where the propriety information is included in the header part and the data part in the DL packet, the propriety information can be included in any field in the header part, and a signal or a subcarrier in a communication band corresponding to the data part in the DL packet can be used for the propriety information, for example.

As described above, the method for including the propriety information can be changed between the header part and the data part in the DL packet.

Furthermore, as described above, by including the propriety information at the plurality of positions in the DL packet, even in a case where a state of the uplink communication varies during a downlink transmission period of the DL packet, and a state of possibility of reception of the UL packet varies, AP1 includes the propriety information indicating possibility of reception of the UL packet after the variation in the DL packet during the downlink transmission period, and therefore can inform STA #i of newest information regarding possibility of reception of the UL packet.

As a result, STA #i can determine possibility of reception of the UL packet at a present time point even in the middle of reception of the DL packet transmitted from AP1, and can control transmission of the UL packet to AP1 on the basis of the determination result.

Herein, in a case where STA #i is receiving the data part in the DL packet, for example, during the downlink transmission of the DL packet transmitted by AP1, for example, the DL packet including the propriety information only at one position in the header part, when AP1 receives the UL packet, AP1 cannot inform STA #i of a fact that reception of the UL packet is impossible.

In other words, when reception of the UL packet is possible, AP1 starts transmitting the DL packet including the propriety information indicating reception possibility in the header part. In a case where one piece of the propriety information is included in the header part in the DL packet transmitted by AP1, STA #i receives the DL packet up to the propriety information in the header part, and determines that the uplink communication to AP1 is possible, since the propriety information indicates reception possibility. STA #i then starts transmitting the UL packet.

On the other hand, in a case where, after starting transmission of the DL packet, AP1 becomes impossible to receive the UL packet, for example, in a case where, after transmitting the header part in the DL packet, AP1 becomes impossible to receive the UL packet, AP1 cannot inform STA #i of the fact that reception of the UL packet is impossible by the propriety information included in the header part in the DL packet, until a next DL packet is transmitted.

Therefore, as illustrated in FIG. 8, AP1 can include the propriety information at the plurality of positions in the DL packet. For example, by including the propriety information at one or more positions in the header part in the DL packet and one or more positions in the data part in the DL packet, even in a case where AP1 becomes impossible to receive the UL packet after transmission of the header part in the DL packet, AP1 can inform STA #i of the fact that AP1 is impossible to receive the UL packet, by the propriety information included in the data part in the DL packet.

For example, as explained in FIG. 5, in a case where STA1 and STA3 are going to start transmitting the UL packet, when AP1 sets the propriety information in the header part to be reception possibility, and starts transmitting the DL packet including this header part, STA1 and STA3 start acquiring the transmission right as preparation of transmission of the UL packet at a time point of reception of the propriety information that is included in the header part in the DL packet from AP1 and indicates reception possibility.

As explained in FIG. 5, STA1 acquires the transmission right prior to STA3. In a case where STA1 starts transmitting the UL packet after terminating transmission of the header part in the DL packet by AP1, and before transmitting the data part, AP1 sets the propriety information in the data part to be transmitted next to be reception impossibility in response to transmission of the UL packet from STA1 (a state of the uplink communication), and then AP1 transmits the data part.

STA3 received such propriety information in the data part refrains from transmitting the UL packet to AP1. As a result, collision between the UL packet of STA1 and the UL packet of STA3 due to STA3 starting transmission of the UL packet to AP1 can be avoided.

Note that STA1 starts transmitting the UL packet to AP1, and therefore STA1 cannot receive the data part including the propriety information indicating reception impossibility, in the DL packet from AP1. Therefore, STA1 performs (continues) transmission of the UL packet to AP1.

In addition, in FIG. 5, since STA3 is receiving the DL packet addressed to STA2 from AP1, STA3 may fail to detect a fact that STA1 starts transmitting the UL packet to AP1. In a case where STA3 fails to detect the fact that STA1 is transmitting the UL packet to AP1, STA3 starts transmitting the UL packet to AP1. When STA3 starts transmitting the UL packet to AP1, collision between the UL packet of STA1 and the UL packet of STA3 occurs.

In addition, when reception power, at STA3, of a signal of the UL packet being transmitted from STA1 to AP1 does not exceed the second threshold, STA3 fails to detect the fact that STA1 is transmitting the UL packet to AP1. This causes STA3 to start transmitting the UL packet to AP1, whereby collision between the UL packet of STA1 and the UL packet of STA3 occurs.

Therefore, when receiving the UL packet from STA1, AP1 sets the propriety information included in the data part in the DL packet while being transmitted to be reception impossibility, for example, in response to reception of the UL packet from STA1 (the state of the uplink communication). In a case where the propriety information included in the data part in the DL packet while being received from AP1 indicates reception impossibility, STA3 refrains from transmitting the UL packet. This avoids collision between the UL packet of STA1 and the UL packet of STA3, which occurs when STA3 starts transmitting the DL packet to AP1, in a case where STA3 fails to detect the fact that STA1 starts transmitting the UL packet to AP1.

Figure 9:
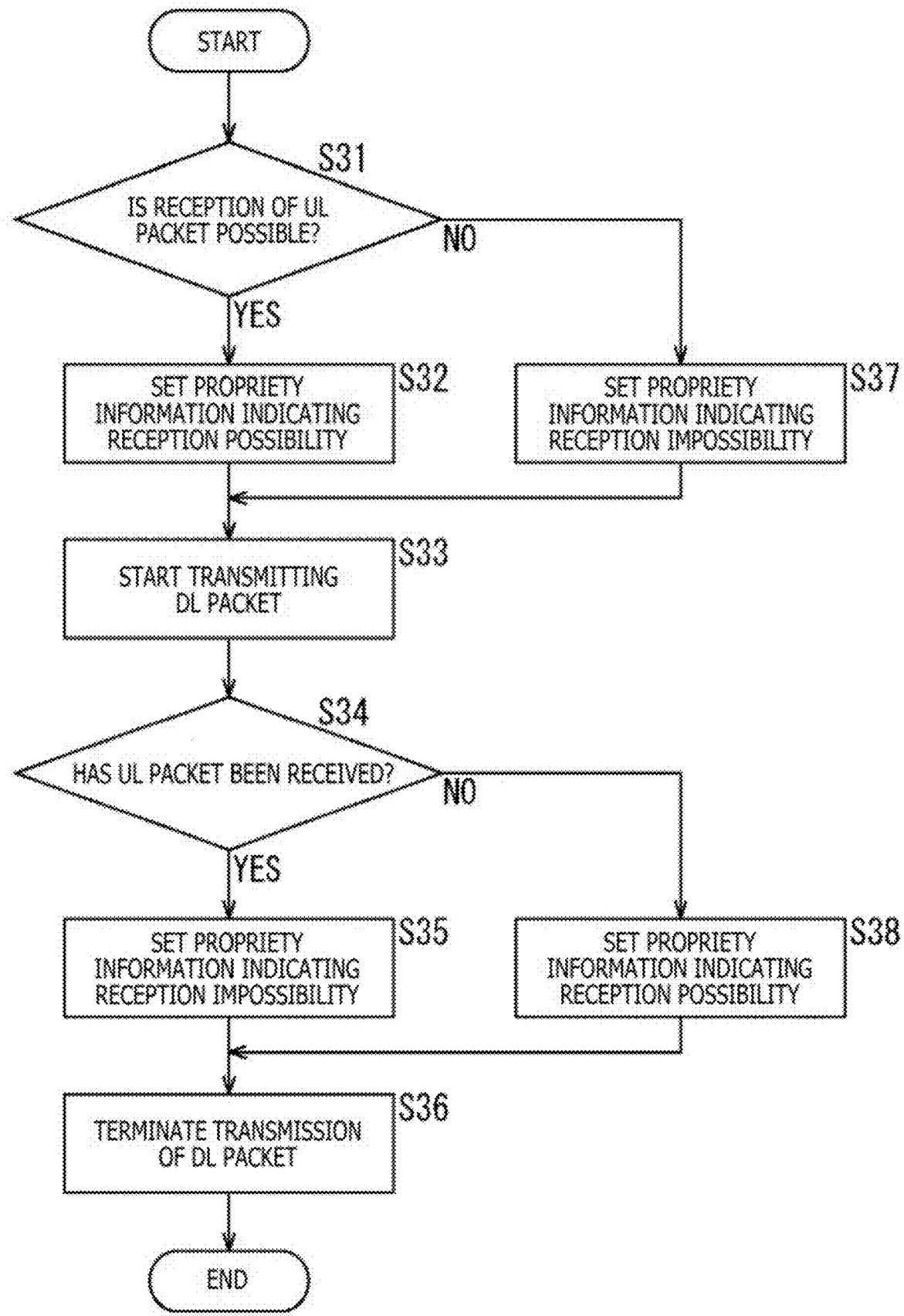
FIG. 9 is a flowchart explaining an example of a process performed in AP1 in a case where the DL packet in FIG. 8 is transmitted.

FIG. 9 is a flowchart explaining an example of a process performed in AP1 in a case where the DL packet in FIG. 8 is transmitted.

In step S31, AP1 determines whether or not reception of the UL packet in the uplink communication is possible, on the basis of whether or not the UL packet in the uplink communication is being received from STA #i.

In step S31, in a case where AP1 determines that reception of the UL packet in the uplink communication is possible, that is, the UL packet is not being received from any STA #i, the process proceeds to step S32.

In step S32, AP1 sets the propriety information so as to indicate reception possibility, and the process proceeds to step S33.

On the other hand, in step S31, in a case where AP1 determines that reception of the UL packet in the uplink communication is impossible, that is, AP1 is receiving the UL packet from any STA #i, the process proceeds to step S37.

In step S37, AP1 sets the propriety information so as to indicate reception impossibility, and the process proceeds to step S33.

In step S33, AP1 starts transmitting the DL packet including the propriety information, and the process proceeds to step S34. When the DL packet is transmitted, the propriety information set in step S32 or step S37 is included at a newest insertion position of this DL packet.

In step S34, AP1 determines whether or not AP1 has received the UL packet from STA #i.

In step S34, in a case where AP1 determines that AP1 has received the UL packet from STA #i, that is, in a case where AP1 has received the UL packet from any STA #i while transmitting the DL packet started in step S32, the process proceeds to step S35.

In step S35, AP1 sets (changes) the propriety information so as to indicate reception impossibility, and the process proceeds to step S36.

On the other hand, in step S34, in a case where AP1 determines that AP1 has not received the UL packet from STA #i, that is, in a case where AP1 has not received the UL packet from any STA #i while transmitting the DL packet started in step S32, the process proceeds to step S38.

In step S38, AP1 sets the propriety information so as to indicate reception possibility, and the process proceeds to step S36.

Herein, the propriety information set in step S35 or step S38 is included at a newest insertion position in the DL packet started being transmitted in step S33.

In step S36, AP1 transmits the DL packet up to the last of the data part, and then terminates transmission of the DL packet to terminate the process.

As described above, like the DL packet explained in FIG. 8, the propriety information is included at the plurality of positions in the DL packet. Therefore, even when the state of the uplink communication varies during transmission of the DL packet, AP1 can inform STA #i of possibility of reception of the UL packet in response to the state of the uplink communication after the variation.

Figure 10:
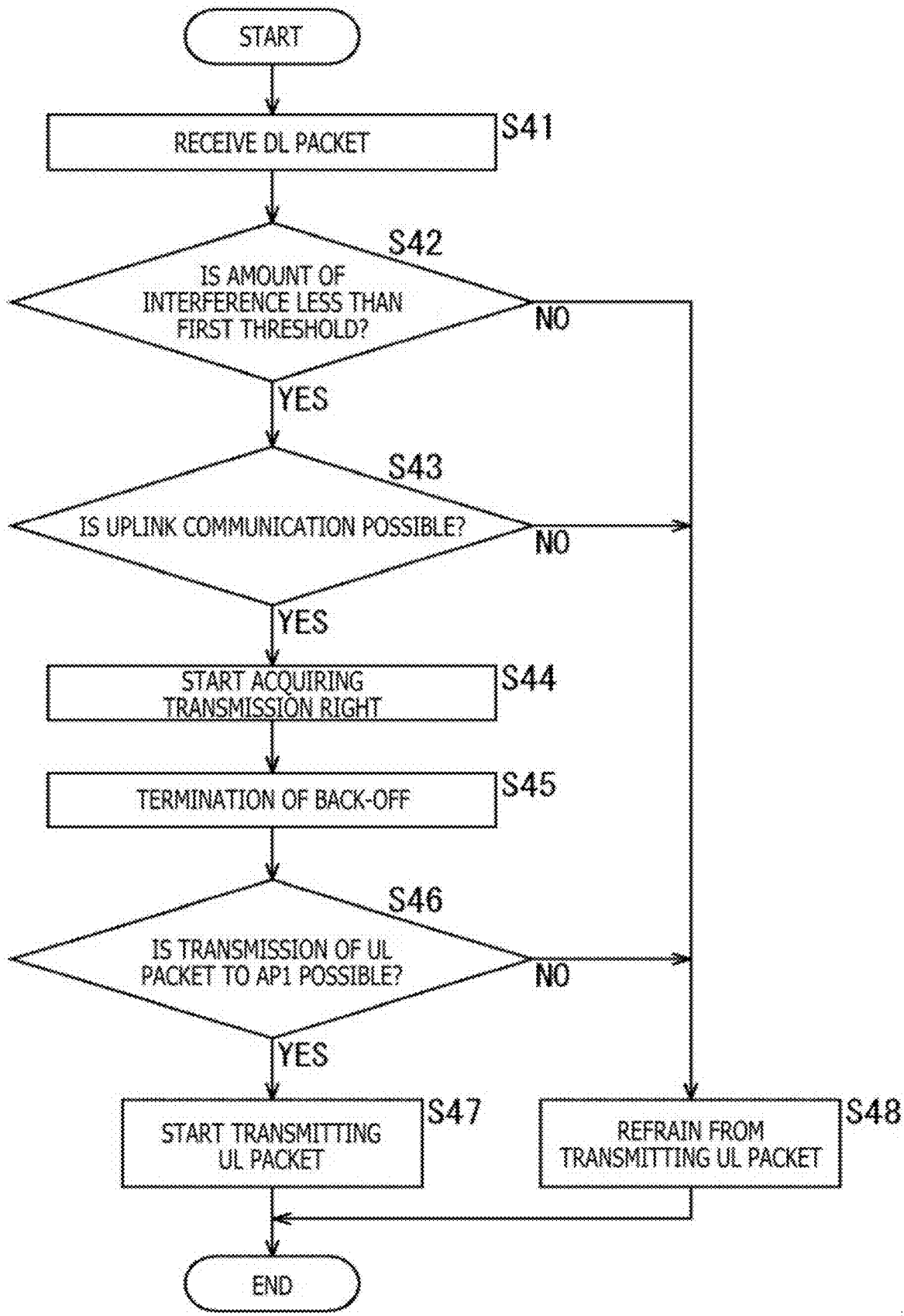
FIG. 10 is a flowchart explaining an example of a process performed in STA #i in a case where the DL packet in FIG. 8 is transmitted.

FIG. 10 is a flowchart explaining an example of a process performed in STA #i in a case where the DL packet in FIG. 8 is transmitted.

In FIG. 10, processes in step S41 to step S45 are performed similarly to the processes in step S21 to step S25 in FIG. 7, respectively.

In step S42, in a case where it is determined that the amount of interference on the address of the DL packet is more than the first threshold that is, for example, the fixed value held by STA #i or the threshold informed from AP1 in a case where the UL packet is transmitted, and in a case where it is determined that transmission of the UL packet to AP1 in the uplink communication is impossible in step S43, the process proceeds to step S48.

In step S48, similarly to step S27 in FIG. 7, STA #i refrains from transmitting the UL packet to AP1, and the process is terminated.

After the back-off is terminated in step S45, in step S46, STA #i starts receiving the DL packet in step S41, and determines whether or not transmission of the UL packet to AP1 in the uplink communication is possible from the newest propriety information included in the DL packet that is being received also at present.

In step S46, in a case where STA #i determines that transmission of the UL packet to AP1 in the uplink communication is possible, that is, the newest propriety information included in the DL packet from AP1 indicates reception possibility, the process proceeds to step S47.

In step S47, STA #i starts transmitting the UL packet to AP1, and after the last of the data part in the UL packet is transmitted, the process is terminated.

On the other hand, in step S46, in a case where STA #i determines that transmission of the UL packet to AP1 in the uplink communication is impossible, that is, the newest propriety information included in the DL packet from AP1 indicates reception impossibility, the process proceeds to step S48, and STA #i refrains from transmitting the UL packet to AP1 as described above.

In this manner, AP1 transmits the DL packet including the propriety information at the plurality of positions, and STA #i determines whether or not transmission of the UL packet to the AP1 in the uplink communication is possible from the newest propriety information included in the DL packet, and controls transmission of the UL packet to AP1.

Accordingly, in the wireless communication system 10, in a case where AP1 is already receiving the UL packet from any STA #i, AP1 transmits the DL packet including the propriety information indicating reception impossibility, thereby preventing simultaneous occurrence of the plurality of pieces of uplink communication to AP1. This can prevent AP1 from failing to receive the UL packet in the uplink communication, that is, avoid collision between the packets occurring due to transmission of the packets from the plurality of STAs.

Furthermore, as described above, STA #i receives, from AP1, the DL packet including the propriety information at the plurality of positions. Therefore, in a case where STA #i detects the propriety information indicating reception impossibility after STA #i starts preparing to transmit the UL packet to AP1, and before STA #i starts transmitting the UL packet to AP1, STA #i determines that transmission of the UL packet to AP1 in the uplink communication is impossible, and refrains from transmitting the UL packet to AP1.

Accordingly, collision between the packets occurring in a case where the plurality of STAs each determine that transmission of the UL packet to AP1 in the uplink communication is possible, and perform transmission of the UL packet to AP1 can be avoided.

In other words, for example, it is assumed that AP1 starts transmitting the DL packet including the propriety information at the plurality of positions (in each of the header part and the data part in the DL packet), and the header part in the DL packet includes the propriety information indicating reception possibility. STA #i determines that transmission of the UL packet to AP1 in the uplink communication is possible by receiving the header part, in the DL packet, including the propriety information indicating reception possibility. STA #i starts preparing to transmit the UL packet to AP1 in the uplink communication according to the determination, and starts transmitting the UL packet to AP1 in the uplink communication. In AP1, when AP1 receives the UL packet that is started to be transmitted by STA #i, reception of the UL packet from another STA #j becomes impossible, the propriety information included in the data part in the DL packet that is being transmitted is set to be reception impossibility, and the data part including such propriety information is transmitted.

Similarly to STA #i, another STA #j other than STA #i also receives the header part including the propriety information indicating reception possibility, and therefore starts preparing to transmit the UL packet to AP1 in the uplink communication. However, when receiving the data part including the propriety information indicating reception impossibility from AP1 before starting transmission, STA #j refrains from transmitting the UL packet to AP1 in the uplink communication in response to the propriety information.

As described above, AP1 transmits the DL packet including the propriety information at the plurality of positions. With this procedure, STA #j can be prevented from starting transmission of the UL packet to AP1 in the uplink communication immediately after STA #i starts transmitting the UL packet to AP1 in the uplink communication, and therefore collision between the packets of STA #i and STA #j can be avoided.

Note that, in the above description, a case where the present technology is applied to the wireless LAN conforming to IEEE 802.11 is explained. However, the present technology can be applied to wireless full duplex communication, other than the wireless LAN conforming to IEEE 802.11.

<Computer to which the Present Technology is Applied>

Subsequently, a series of processes described above of, for example, the data processor 51 and the signal processor 62 can be performed by hardware or software. In a case where the series of processes is performed by software, a program configuring the software is installed in a computer.

Therefore, FIG. 11 illustrates a configuration example of an embodiment of the computer in which the program performing the series of processes described above is installed.

In FIG. 11, a CPU (Central Processing Unit) 201 performs various kinds of processes according to a program stored in a ROM (Read Only Memory) 202, or a program loaded in a RAM (Random Access Memory) 203 from a storage 108. In the RAM 203, for example, data necessary when the CPU 201 performs various kinds of processes is also stored as appropriate.

The CPU 201, the ROM 202, and the RAM 203 are mutually connected through a bus 204. In addition, an input/output interface 205 is also connected to the bus 204.

The input/output interface 205 is connected with an input section 206 including, for example, a keyboard and a mouse, an output section 207 including, for example, a display such as an LCD (liquid crystal display) and a speaker, a storage 208 configured with, for example, a hard disk, and a communication section 209 configured with, for example, a modem and a terminal adapter. The communication section 209 performs a communication process through a network such as the Internet.

The input/output interface 205 is also connected with a drive 210 as necessary. A removable medium 211 such as a magnetic disk, an optical disk, a magneto-optical disk, or a semiconductor memory is mounted on the drive 210 as appropriate, and a computer program read from the removable medium 211 is installed in the storage 208 as necessary.

Note that the program to be executed by the computer may be a program in which the processes are performed in time series in the order described in the present specification, or may be a program in which the processes are performed in parallel or at a required timing, for example, when a call is issued.

Furthermore, the embodiments of the present technology are not limited to the above-described embodiments, and can variously be modified without departing from the gist of the present technology.

Note that effects described in the present specification are merely illustrative, and are not limited. Effects other than the effects described in the present specification may be obtained.

<Others>

The present technology can adopt the following configurations.

(1)

A wireless communication device in a wireless communication system including the wireless communication device that functions as a base station and one or more wireless communication terminals that communicate with the wireless communication device as slave units, the wireless communication device including:

a controller configured to set propriety information that indicates whether or not reception of a packet transmitted from the wireless communication terminals is possible during a downlink transmission period when the wireless communication device transmits a packet; and a communication section configured to transmit the packet including the propriety information.

(2)

The wireless communication device according to (1), in which the controller sets the propriety information so as to indicate reception possibility or reception impossibility according to a state of uplink communication in which the packet is transmitted from the wireless communication terminals to the wireless communication device.

(3)

The wireless communication device according to (1) or (2), in which the controller sets the propriety information so as to indicate the reception possibility or the reception impossibility according to the state of the uplink communication during the downlink transmission period.

(4)

The wireless communication device according to any one of (1) to (3), in which the packet from the wireless communication device includes a header part and a data part, and the propriety information is included in the header part or the data part in the packet from the wireless communication device.

(5)

The wireless communication device according to any one of (1) to (3), in which the packet from the wireless communication device includes a header part and a data part, and the propriety information is included in the header part and the data part in the packet from the wireless communication device.

(6)

The wireless communication device according to any one of (1) to (5), in which a signal in a part of a communication band when the packet from the wireless communication device is transmitted to the wireless communication terminals or a part of a subcarrier is used as the propriety information.

(7)

The wireless communication device according to any one of (1) to (6), in which the propriety information is included at a plurality of positions of the packet from the wireless communication device.

(8)

A wireless communication method in a wireless communication system including a wireless communication device that functions as a base station and one or more wireless communication terminals that communicate with the wireless communication device as slave units, the wireless communication method including:

setting propriety information that indicates whether or not reception of a packet transmitted from the wireless communication terminals is possible during a downlink transmission period when the wireless communication device transmits a packet; and transmitting the packet including the propriety information.

(9)

A wireless communication terminal in a wireless communication system including a wireless communication device that functions as a base station and one or more wireless communication terminals that communicate with the wireless communication device as slave units, the wireless communication terminal including:

a controller that controls transmission of a packet to the wireless communication device, during a downlink transmission period when the wireless communication device transmits a packet, according to propriety information included in the packet, the propriety information indicating whether or not reception of packets transmitted from the wireless communication terminals is possible.

(10)

The wireless communication terminal according to (9), in which the packet from the wireless communication device further includes an address, and the controller controls transmission of the packet to the wireless communication device according to the address and the propriety information.

(11)

The wireless communication terminal according to (9) or (10), in which the controller starts preparing to transmit the packet to the wireless communication device in a case where no interference with the wireless communication terminal corresponding to the address occurs and the propriety information indicates reception possibility.

(12)

The wireless communication terminal according to any one of (9) to (11), in which the propriety information is included at a plurality of positions in the packet from the wireless communication device, the controller refrains from transmitting the packet to the wireless communication device, in a case where the propriety information indicating reception impossibility is detected from the packet that is being received from the wireless communication device, after the controller starts preparing to transmit the packet to the wireless communication device and before the controller starts transmitting the packet to the wireless communication device.

(13)

A wireless communication method in a wireless communication system including a wireless communication device that functions as a base station and one or more wireless communication terminals that communicate with the wireless communication device as slave units, the wireless communication method including:

controlling transmission of a packet to the wireless communication device, during a downlink transmission period when the wireless communication device transmits a packet, according to propriety information included in the packet, the propriety information indicating whether or not reception of packets transmitted from the wireless communication terminals is possible.

REFERENCE SIGNS LIST

10: Wireless communication system, 20, 30: Communication device, 51: Data processor, 52: Controller, 53: Communication section, 61: Modulation/demodulation section, 62: Signal processor, 63: Channel estimation section, 64$_i$: Wireless interface, 65$_i$: Amplifier, 66$_i$: Antenna, 71: Power supply section, 151: Data processor, 152: Controller, 153: Communication section, 161: Modulation/demodulation section, 162: Signal processor, 163: Channel estimation section, 164$_i$: Wireless interface, 165$_i$: Amplifier, 166$_i$: Antenna, 171: Power supply section, 201: CPU, 202: ROM, 203: RAM, 204: Bus, 205: Input/output interface, 206: Input section, 207: Output section, 208: Storage, 209: Communication section, 210: Drive, 211: Removable disk

The invention claimed is:

1. A wireless communication device in a wireless communication system including the wireless communication device, that functions as a base station or an access point, and one or more wireless communication terminals that communicate with the wireless communication device as slave units, the wireless communication device comprising:
a transceiver; and
control circuitry configured to:
transmit a DL packet during a downlink transmission period, the DL packet including propriety information that indicates whether or not reception of any uplink (UL) packet to be transmitted from the one or more wireless communication terminals is possible during a downlink transmission period, the downlink transmission period being a period when the wireless communication device transmits a downlink (DL) packet;
while transmitting the DL packet during the downlink transmission period, determine whether or not at least one UL packet was received from one of the one or more wireless communication terminals:
upon determining that no UL packet was received from one of the one or more wireless communication terminals while transmitting the DL packet during the downlink transmission period, re-set the propriety information to indicate that reception of any uplink (UL) packet to be transmitted from the one or more wireless communication terminals is possible; or
upon determining that at least one UL packet was received from one of the one or more wireless communication terminals while transmitting the DL packet during the downlink transmission period, re-set the propriety information to indicate that reception of any uplink (UL) packet to be transmitted from the one or more wireless communication terminals is not possible; and
terminate the transmitting of the DL packet after performing any re-setting of the propriety information based on the determining whether or not the at least one UL packet was received from the one of the one or more wireless communication terminals.

2. The wireless communication device according to claim 1, wherein
the control circuitry sets the propriety information so as to indicate reception possibility or reception impossibility according to a state of uplink communication in which the UL packet is transmitted from the one or more wireless communication terminals to the wireless communication device.

3. The wireless communication device according to claim 2, wherein
the control circuitry sets the propriety information so as to indicate the reception possibility or the reception impossibility according to the state of the uplink communication during the downlink transmission period.

4. The wireless communication device according to claim 1, wherein
the DL packet from the wireless communication device includes a header part and a data part, and
the propriety information is included in the header part or the data part in the packet from the wireless communication device.

5. The wireless communication device according to claim 1, wherein
the DL packet from the wireless communication device includes a header part and a data part, and
the propriety information is included in the header part and the data part in the packet from the wireless communication device.

6. The wireless communication device according to claim 1, wherein
a signal in a part of a communication band when the DL packet from the wireless communication device is transmitted to the one or more wireless communication terminals or a part of a subcarrier is used as the propriety information.

7. The wireless communication device according to claim 1, wherein
the propriety information is included at a plurality of positions of the DL packet from the wireless communication device.

8. A wireless communication method in a wireless communication system including a wireless communication device, that functions as a base station or an access point, and one or more wireless communication terminals that communicate with the wireless communication device as slave units, the wireless communication method comprising:
transmitting a DL packet during a downlink transmission period, the DL packet including propriety information that indicates whether or not reception of any uplink (UL) packet to be transmitted from the one or more wireless communication terminals is possible during a downlink transmission period, the downlink transmission period being a period when the wireless communication device transmits a downlink (DL) packet;
while transmitting the DL packet during the downlink transmission period, determining whether or not at least one UL packet was received from one of the one or more wireless communication terminals:
upon determining that no UL packet was received from one of the one or more wireless communication terminals while transmitting the DL packet during the downlink transmission period, re-setting the propriety information to indicate that reception of any uplink (UL) packet to be transmitted from the one or more wireless communication terminals is possible; or
upon determining that at least one UL packet was received from one of the one or more wireless communication terminals while transmitting the DL packet during the downlink transmission period, re-setting the propriety information to indicate that reception of any uplink (UL) packet to be transmitted from the one or more wireless communication terminals is not possible; and
terminating the transmitting of the DL packet after performing any re-setting of the propriety information based on the determining.

9. A wireless communication terminal in a wireless communication system including a wireless communication device, that functions as a base station or an access point, and one or more wireless communication terminals that communicate with the wireless communication device as slave units, the wireless communication terminal comprising:
a transceiver; and
control circuitry configured to:
receive a downlink (DL) packet from the wireless communication device during a downlink transmission period, the DL packet including propriety information that indicates whether or not reception of any uplink (UL) packet to be transmitted from the wireless communication terminal is possible during the downlink transmission period;

determine whether an uplink transmission of an uplink (UL) packet to the wireless communication device is possible during the downlink transmission period;

upon determining that the uplink transmission of the UL packet to the wireless communication device is possible during the downlink transmission period, acquire a transmission right;

based a characteristic of the transmission right, perform a second determination to determine whether or not the uplink transmission of the UL packet to the wireless communication device is still possible during the downlink transmission period;

based on the second determination indicating that the uplink transmission of the UL packet to the wireless communication device is still possible during the downlink transmission period, transmit the UL packet during the downlink transmission period; or based on the second determination indicating that the uplink transmission of the UL packet to the wireless communication device is not possible during the downlink transmission period, refrain from transmitting the UL packet during the downlink transmission period.

10. The wireless communication terminal according to claim 9, wherein the DL packet from the wireless communication device further includes an address, and the control circuitry controls transmission of the packet to the wireless communication device according to the address and the propriety information.

11. The wireless communication terminal according to claim 10, wherein the control circuitry starts preparing to transmit the packet to the wireless communication device in a case where no interference with the wireless communication terminal corresponding to the address occurs and the propriety information indicates reception possibility.

12. The wireless communication terminal according to claim 11, wherein the propriety information is included at a plurality of positions in the DL packet from the wireless communication device, and the control circuitry refrains from transmitting the UL packet to the wireless communication device, in a case where the propriety information indicating reception impossibility is detected from the DL packet that is being received from the wireless communication device, after the control circuitry starts preparing to transmit the UL packet to the wireless communication device and before the control circuitry starts transmitting the UL packet to the wireless communication device.

13. A wireless communication method in a wireless communication system including a wireless communication device, that functions as a base station or an access point, and one or more wireless communication terminals that communicate with the wireless communication device as slave units, the wireless communication method comprising:

receiving a downlink (DL) packet from the wireless communication device during a downlink transmission period, the DL packet including propriety information that indicates whether or not reception of any uplink (UL) packet to be transmitted from the wireless communication terminal is possible during the downlink transmission period;

determining whether an uplink transmission of an uplink (UL) packet to the wireless communication device is possible during the downlink transmission period;

upon determining that the uplink transmission of the UL packet to the wireless communication device is possible during the downlink transmission period, acquiring a transmission right;

based a characteristic of the transmission right, performing a second determination to determine whether or not the uplink transmission of the UL packet to the wireless communication device is still possible during the downlink transmission period;

based on the second determination indicating that the uplink transmission of the UL packet to the wireless communication device is still possible during the downlink transmission period, transmitting the UL packet during the downlink transmission period; or based on the second determination indicating that the uplink transmission of the UL packet to the wireless communication device is not possible during the downlink transmission period, refraining from transmitting the UL packet during the downlink transmission period.

* * * * *